US008392405B2

(12) United States Patent
Idicula et al.

(10) Patent No.: US 8,392,405 B2
(45) Date of Patent: Mar. 5, 2013

(54) PERFORMING COST-BASED OPTIMIZATIONS OF AUTHORIZATION CHECKS IN DATABASE SYSTEMS

(75) Inventors: Sam Idicula, Mountain View, CA (US); Mohammed Irfan Rafiq, Mountain View, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 748 days.

(21) Appl. No.: 12/144,028

(22) Filed: Jun. 23, 2008

(65) Prior Publication Data

US 2009/0319477 A1 Dec. 24, 2009

(51) Int. Cl.
*G06F 7/00* (2006.01)
(52) U.S. Cl. .......................................... 707/719; 707/785
(58) Field of Classification Search ........................ None
See application file for complete search history.

(56) References Cited

U.S. PATENT DOCUMENTS

| | | | | | |
|---|---|---|---|---|---|
| 5,991,754 | A  * | 11/1999 | Raitto et al. | ........................... | 1/1 |
| 6,026,391 | A  * | 2/2000  | Osborn et al. | ........................ | 1/1 |
| 6,366,915 | B1 * | 4/2002  | Rubert et al. | ................. | 707/770 |
| 6,438,541 | B1 * | 8/2002  | Witkowski | ..................... | 707/714 |
| 6,477,525 | B1 * | 11/2002 | Bello et al. | ............................. | 1/1 |
| 6,496,819 | B1 * | 12/2002 | Bello et al. | ............................. | 1/1 |
| 6,526,403 | B1 * | 2/2003  | Lin et al. | ............................... | 1/1 |
| 6,615,203 | B1 * | 9/2003  | Lin et al. | ............................... | 1/1 |
| 7,512,591 | B2 * | 3/2009  | Bildhaeuser et al. | ................. | 1/1 |
| 7,668,803 | B2 * | 2/2010  | Zurek et al. | .................... | 707/719 |
| 7,685,194 | B2 * | 3/2010  | Kabra et al. | .................... | 707/719 |
| 7,805,436 | B2 * | 9/2010  | Richards et al. | ............. | 707/720 |
| 7,809,751 | B2 * | 10/2010 | Fuerst et al. | .................. | 707/783 |
| 7,930,277 | B2 * | 4/2011  | Ge et al. | ......................... | 707/688 |
| 8,051,069 | B2 * | 11/2011 | Johnson et al. | ................ | 707/718 |
| 8,135,703 | B2 * | 3/2012  | Barsness et al. | .............. | 707/719 |
| 8,229,922 | B2 * | 7/2012  | Weissman et al. | ............. | 707/715 |
| 2007/0276835 | A1 * | 11/2007 | Murthy | ............................ | 707/9 |
| 2008/0114744 | A1 * | 5/2008  | Colby et al. | ....................... | 707/4 |
| 2008/0177770 | A1 * | 7/2008  | Friedlander et al. | ........... | 707/101 |
| 2008/0222092 | A1 * | 9/2008  | Hueske et al. | ..................... | 707/2 |
| 2008/0222123 | A1 * | 9/2008  | Colby et al. | ....................... | 707/4 |
| 2009/0063490 | A1 * | 3/2009  | Fuerst et al. | ...................... | 707/9 |
| 2009/0106207 | A1 * | 4/2009  | Solheim et al. | ................... | 707/3 |

FOREIGN PATENT DOCUMENTS

JP          10320212 A    * 12/1998

OTHER PUBLICATIONS

Machine Translation of Ichiro, JP 10-320212 A.*
Machine Translation of Ichiro, JP 10-320212 A, printed on Dec. 28, 2010.*

* cited by examiner

*Primary Examiner* — Hung Q Pham
*Assistant Examiner* — Hubert Cheung
(74) *Attorney, Agent, or Firm* — Shun Yao; Park, Vaughan, Fleming & Dowler LLP

(57) ABSTRACT

One embodiment of the present invention provides a system that facilitates performing a cost-based optimization of authorization checks in a database system. During operation, the system receives a query at the database system. Next, the system estimates a cost for executing the query, which involves estimating a cost for evaluating authorization checks, which involve functional evaluations of access rights for data accessed by the query. The system then rewrites the query to include evaluating authorization checks within the query. The system also estimates a cost for executing the rewritten query. Next, the system determines if executing the rewritten query has a lower cost than executing the query and performing the authorization checks. If so, the system executes the rewritten query. However, if not, the system executes the query.

24 Claims, 5 Drawing Sheets

EMPLOYEE DATABASE 170

| NAME | TITLE | SALARY |
|---|---|---|
| AMY SMITH | MANAGER | $110,000 |
| DAN HANSEN | SOFTWARE ENGINEER | $80,000 |
| ROBERT JONES | JANITOR | $35,000 |
| NANCY GREEN | COMEDIAN | $150,000 |

READ/WRITE PRIVILEGES FOR MANAGERS 210

FIG. 2A

EMPLOYEE DATABASE 170

| NAME | TITLE | SALARY |
|---|---|---|
| AMY SMITH | MANAGER | $110,000 |
| DAN HANSEN | SOFTWARE ENGINEER | $80,000 |
| ROBERT JONES | JANITOR | $35,000 |
| NANCY GREEN | COMEDIAN | $150,000 |

READ PRIVILEGES FOR ALL EMPLOYEES 220

FIG. 2B

READ PRIVILEGES FOR AMY SMITH 230

EMPLOYEE DATABASE 170

| NAME | TITLE | SALARY |
|---|---|---|
| AMY SMITH | MANAGER | $110,000 |
| DAN HANSEN | SOFTWARE ENGINEER | $80,000 |
| ROBERT JONES | JANITOR | $35,000 |
| NANCY GREEN | COMEDIAN | $150,000 |

FIG. 2C

```
<ACL>
    <SECURITYCLASS>sc1</SECURITYCLASS>
    <ACE>
        <GRANT>true</GRANT>
        <PRINCIPAL>user1</PRINCIPAL>
        <PRIVILEGES>
            <PRIV>read</PRIV>
            <PRIV>write</PRIV>
            <PRIV>execute</PRIV>
        </PRIVILEGES>
    </ACE>
    <ACE>
        <GRANT>true</GRANT>
        <PRINCIPAL>user2</PRINCIPAL>
        <PRIVILEGES>
            <PRIV>read</PRIV>
        </PRIVILEGES>
    </ACE>
</ACL>
```

XML ACCESS CONTROL LIST 300

FIG. 3

Selectivity Function for Static ACLs

Selec = Max(#rows-accessible(U), #rows-accessible(R1), ...) / Total number of rows in Table U = current user R1, ... = set of enabled roles rows-accessible(p) = Number of rows on which the principle p has been granted any privilege. If the principal occurs as part of SYS_ACLIDs column statistics, then use the value from stats. Else, assume default of (0.1 * total-rows)

Selectivity Function for Dynamic ACLs

Selec = selec-rows(cond-1, A1) + selec-rows(cond-2, A2) + ... / Total number of rows in Table Selec-rows(cond-I, Ai) = Estimated number of rows selected by cond-i, if Ai returns TRUE for current user/roles. Else, 0.

FIG. 4

PERFORMING COST-BASED OPTIMIZATIONS OF AUTHORIZATION CHECKS IN DATABASE SYSTEMS

BACKGROUND

1. Field of the Invention

The present invention relates to database systems. More specifically, the present invention relates to a method and an apparatus for performing cost-based optimizations of authorization checks in database systems.

2. Related Art

Many organizations use Access Control Lists (ACLs) to control an entity's access to particular objects within database systems. An ACL typically comprises a list of Access Control Entries (ACEs) that specify the privileges granted and/or denied to a given entity. ACLs may be stored in various formats, such as in eXtensible Markup Language (XML) files, or within database tables. Each format has advantages and disadvantages related to speed, resource consumption, and security.

When implementing a database system with ACLs, database administrators typically determine which ACL-based security model he or she will use. There are multiple ways to evaluate the ACLs involved in a given security model. However, in this situation, it can be problematic to determine which evaluation method should be used for a given request.

SUMMARY

One embodiment of the present invention provides a system that facilitates performing a cost-based optimization of authorization checks in a database system. During operation, the system receives a query at the database system. Next, the system estimates a cost for executing the query, which involves estimating a cost for evaluating authorization checks, which involve functional evaluations of access rights for data accessed by the query. The system then rewrites the query to include evaluating authorization checks within the query. The system also estimates a cost for executing the rewritten query. Next, the system determines if executing the rewritten query has a lower cost than executing the query and performing the authorization checks. If so, the system executes the rewritten query. However, if not, the system executes the query.

In some embodiments of the present invention, estimating the cost of executing the query involves identifying a user associated with the query. The system then determines one or more database entities associated with the query, and determines one or more Access Control Lists (ACLs) associated with the user and the database entities. Finally, the system performs functional evaluations on the one or more ACLs.

In some embodiments of the present invention, performing functional evaluations on the one or more ACLs involves determining a cache-miss ratio for the one or more ACLs. The system then adjusts the estimated cost to reflect the cache-miss ratio.

In some embodiments of the present invention, estimating the cost of executing the query involves passing the query to a query optimizer. The system then receives the cost for executing the query from the query optimizer.

In some embodiments of the present invention, estimating the cost of executing the rewritten query involves passing the rewritten query to a query optimizer. The system then receives the cost for executing the rewritten query from the query optimizer.

In some embodiments of the present invention, estimating the cost for evaluating authorization checks involves determining a number of rows returned by the query. The system then determines an average cost for performing an authorization check. Finally, the system multiplies the number of rows returned by the query with the average cost for performing the authorization check.

In some embodiments of the present invention, upon executing the query, the system saves statistics related to the costs for performing the evaluation checks to facilitate subsequent estimations for evaluation the costs of performing evaluation checks.

BRIEF DESCRIPTION OF THE FIGURES

FIGS. 2A, 2B, and 2C illustrate subsets of a database 170 and various results of access control entries and subjects in accordance with an embodiment of the present invention.

FIG. 3 illustrates an XML ACL in accordance with an embodiment of the present invention.

FIG. 4 illustrates typical selectivity functions for static and dynamic ACLs in accordance with an embodiment of the present invention.

DETAILED DESCRIPTION

Figure 1:
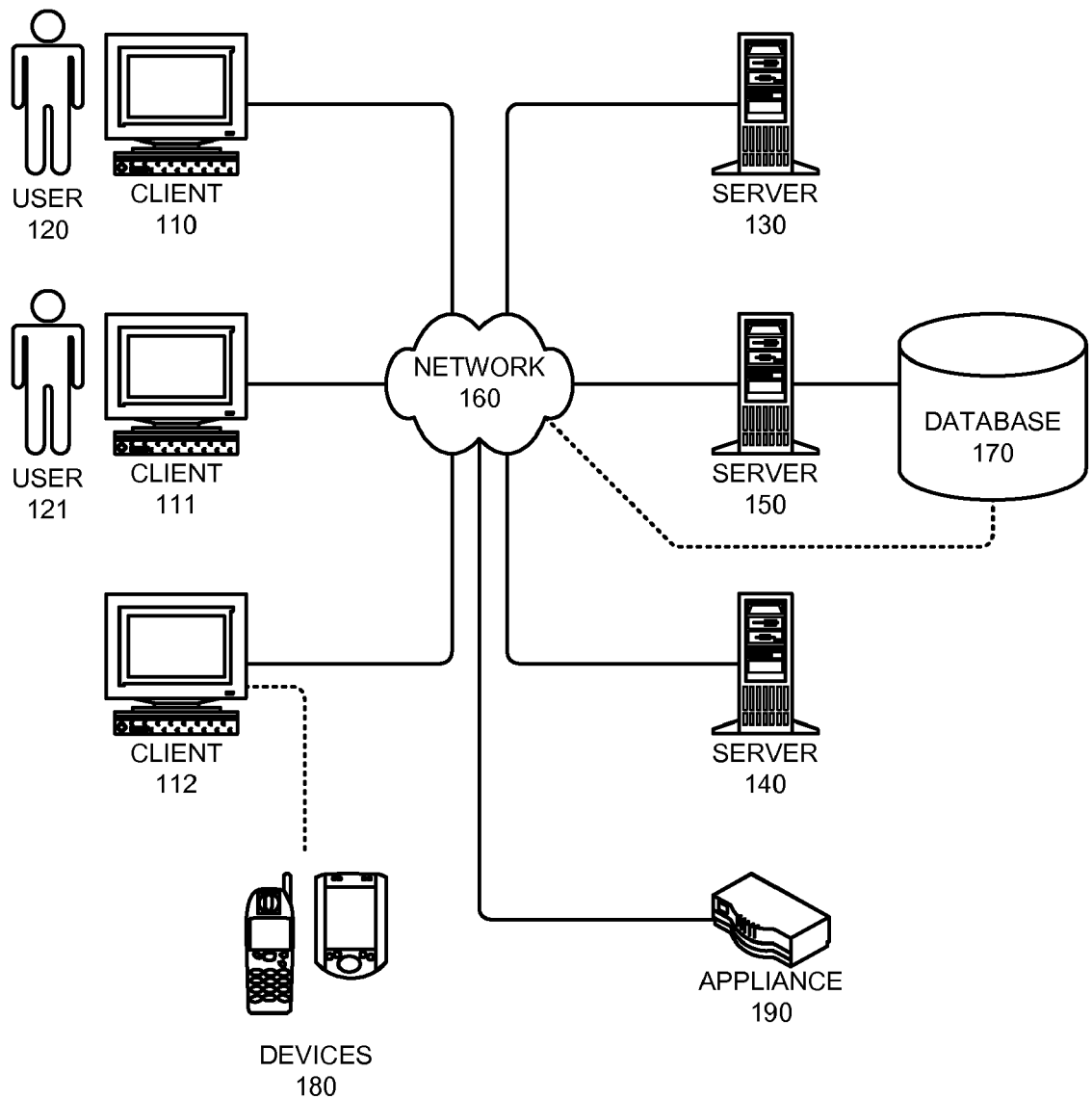
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates performing a cost-based optimization of authorization checks in a database system. During operation, the system receives a query at the database system. Next, the system estimates a cost for executing the query, which involves estimating a cost for evaluating authorization checks, which involve functional evaluations of access rights for data accessed by the query. The system then rewrites the query to include evaluating authorization checks within the query. The system also estimates a cost for executing the rewritten query. Next, the system determines if executing the rewritten query has a lower cost than executing the query and performing the authorization checks. If so, the system executes the rewritten query. However, if not, the system executes the query.

In some embodiments of the present invention, the system is embodied in instructions stored on a computer-readable storage medium. In other embodiments of the present invention, the system comprises an apparatus including a processor and memory. Note that this can include computing systems and appliances.

Many database systems use Access Control Lists (ACLs) to specify which users get what privileges. Note that an ACL comprises a list of Access Control Entries (ACEs). Each ACE specifies what privileges are granted or denied to a particular entity, such as a user. ACLs are typically stored as XML documents, and provide a declarative way to define security policies. In many instances, these ACLs are also stored in the database.

There are multiple techniques for evaluating the authorization checks. One technique is to perform a functional evaluation of the authorization check. This requires evaluating the ACL, or using the ACL result session cache to retrieve the granted and denied bit vectors representing the privileges granted and denied by that ACL. These privileges are then checked against the list of requested privileges to make a determination to allow or deny the requested actions.

The second technique to evaluate authorization checks is to rewrite these authorization checks into a query. Note that this is possible due to the fact that the security policies are stored in the database, and hence there exists some underlying mapping between these XML security documents and the database tables. However, this introduces a new problem: determining which evaluation method to use for a particular authorization check. This is a complex problem because there is no easy way of knowing which sets of checks can be optimally evaluated using either of these two techniques. This depends on a number of factors including the number of ACLS involved in the check, the complexity of the predicates involved in the queries, other ACLs in the system, etc.

Embodiments of the present invention perform a cost-based analysis of the two techniques, and pick the cheaper technique as the driver for evaluating authorization checks. Initially, when a query (with the security policy appended to it) is received at the database, the system estimates the cost of evaluating the query. This is accomplished by costing the functional evaluation part of the authorization check separately from the rest of the query. The costing for the functional evaluation of the authorization check is accomplished by providing a specialized cost function, which analyzes the number of ACLs, and other factors, such as cache miss ratios. Using this information and an estimate of the cost of evaluating an ACL, the system determines a cost for the complete functional evaluation. The cost for the rest of the query is determined by the query optimizer. The two costs are then added together to produce the final cost of evaluating the query.

As for the second technique, the original query can be rewritten by making a copy of the original query and modifying the copy based on the type of ACLs in the authorization check. Consider two security models: one where ACLs are assigned to data items (such as rows in a database table) using a set of rules that can be evaluated at query time—called dynamic ACL assignment; and another where the ACLs to be used are stored along with the data item—called static ACL assignment. For dynamic ACLs, the ACLs are internally functionally evaluated. In most cases, where the ACLs return a DENY or GRANT privilege, the functional evaluation of the checks can henceforth be avoided, and the predicates (or rules) associated with the dynamic ACLs are moved into the original query's "WHERE" clause. For static ACLs, an XML index on the table that stores ACLs is used to find a set of relevant ACLs, which are then used in the rewritten query. In either case, the query is rewritten in a form that the database optimizer understands and can use to perform a cost evaluation.

Based on the costs for the two techniques, the system can then decide to evaluate the authorization checks using the cheaper of the two techniques.

Note that in some embodiments of the present invention, for purposes of the costing function, a number of statistics are maintained on the ACL tables. In addition, a number of other statistics are also maintained, such as the average size of the static ACL list for each user or role, the number of rows to which the principal has been granted any privilege, etc.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network.

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100.

Illustrations of Applying Access Control Entries for Roles and Users

FIGS. 2A, 2B, and 2C illustrate subsets of a database 170 and various results of access control and subjects in accordance with an embodiment of the present invention. For example, FIG. 2A illustrates the result of applying an access control policy for a manager role, indicated as READ/WRITE privileges for managers 210. Note that the manager is allowed read access and write access to all of the entries in the employee database. In contrast, FIG. 2B illustrates the result of applying an access control policy for an employee role, indicated as READ privileges for all employees 220, wherein employees are allowed read access only to the names and titles of employees and not their salaries. FIG. 2C illustrates the result of applying an access control policy for user "Amy Smith," indicated as READ privileges for Amy Smith 230, wherein "Amy Smith" is only allowed to read the entire row associated with "Amy Smith."

XML-Based Access Control Lists

FIG. 3 illustrates an XML ACL ( 300) in accordance with an embodiment of the present invention. This ACL is associated with security class "sc1." It also contains a set of ACEs, wherein there exists one ACE per user. For example, subject "user1" is allowed read, write, and execute privileges for the object associated with this ACL. Various XML-based techniques can be used to represent the same information. For example, the same information might be distributed in multiple XML documents.

Authorization Checks

One embodiment of the present invention uses a CHECK_ACL function to perform authorization checks. The CHECK_ACL SQL function takes the list of static ACLIDs (or a single ACLID) and a set of privileges.

Estimating the selectivity of the CHECK_ACL function is tricky because it depends on the current user and a set of enabled roles. A change in the user or a single role can result in a huge change in the selectivity. For example, the user "Andy" can see only a few rows, but if he enables the "VP" role, then he may be able to see almost all of the rows. Hence, the selectivity estimation needs to take into account the current user and enabled roles. Also, in the case of dynamic ACLs, the selectivity depends on the selectivity of the rules themselves. FIG. 4 illustrates typical selectivity functions for static and dynamic ACLs.

Functional Evaluation

The cost of performing a functional evaluation of CHECK-ACL includes: (1) the cost of evaluating CHECK-ACL's operands( especially in the case of dynamic ACLs, the rules are expressed as scalar subquery operands which might involve access to other side lookup tables), and (2) the cost of evaluating all of the specified ACLIDs.

Query Rewriting to Include Authorization Checks

In order to estimate the cost of performing authorization checks using the query rewrite technique described above, the system rewrites the query and passes the query to the query optimizer to estimate the cost of executing the query. In the case of a single static ACL, a new predicate is attached to the query that checks if the ACLID is present in the list of relevant ACLIDs. Note that the existing CHECK_ACL predicate is retained. Thus, the query:

select * from T where P and CHECK_ACL (privs, ACLID)=1;

is rewritten as:

select * from T where P and CHECK_ACL(privs, ACLID)=1 and ACLID IN (select * from relevant_ACLIDs);

In the case of multiple static ACLs, the hidden SYS_ACLIDS XML Type column stores the list of associated ACLIDs. A new predicate is attached that checks if any of the associated ACLIDs are present in the list of relevant ACLIDs. This subquery will exploit the XML index created on the SYS_ACLIDs column. As before, the original CHECK_ACL predicate is retained as a post filter. Thus, the query:

select * from T where P and CHECK_ACL (privs, ACLID-LIST)=1;

is rewritten as:

select * from T where P and CHECK_ACL(privs, ACLIDLIST)=1 and exits (select 1 from XMLTABLE('/ACLIDS/ACLID/text( )' passing SYS_ACLIDS) where column_value in (select * from relevant_ACLIDs));

In the case of dynamic ACLs, there are no additional hidden columns in the table. Instead, rules and associated ACLIDs are explicitly specified as operands to CHECK_ACL. The first step analyzes the set of specified ACLIDs. This step creates a subset consisting of ACLIDs that grant any of the requested privileges to the current user (and current roles). Then, a new predicate is attached comprising of an OR chain of the rules associated with the ACLIDs in the subset. Thus, the query:

select * from T where P and CHECK_ACL (privs, A1, P1, . . . An, Pn)=1;

is rewritten as:

select * from T where P and CHECK_ACL(privs, A1, P1, ... An, Pn)=1 and (Pi or ... or Pk);

where Pi to Pk represents the predicates of the subset of ACLIDs as discussed above.

Cost-Based Optimization

Figure 5:
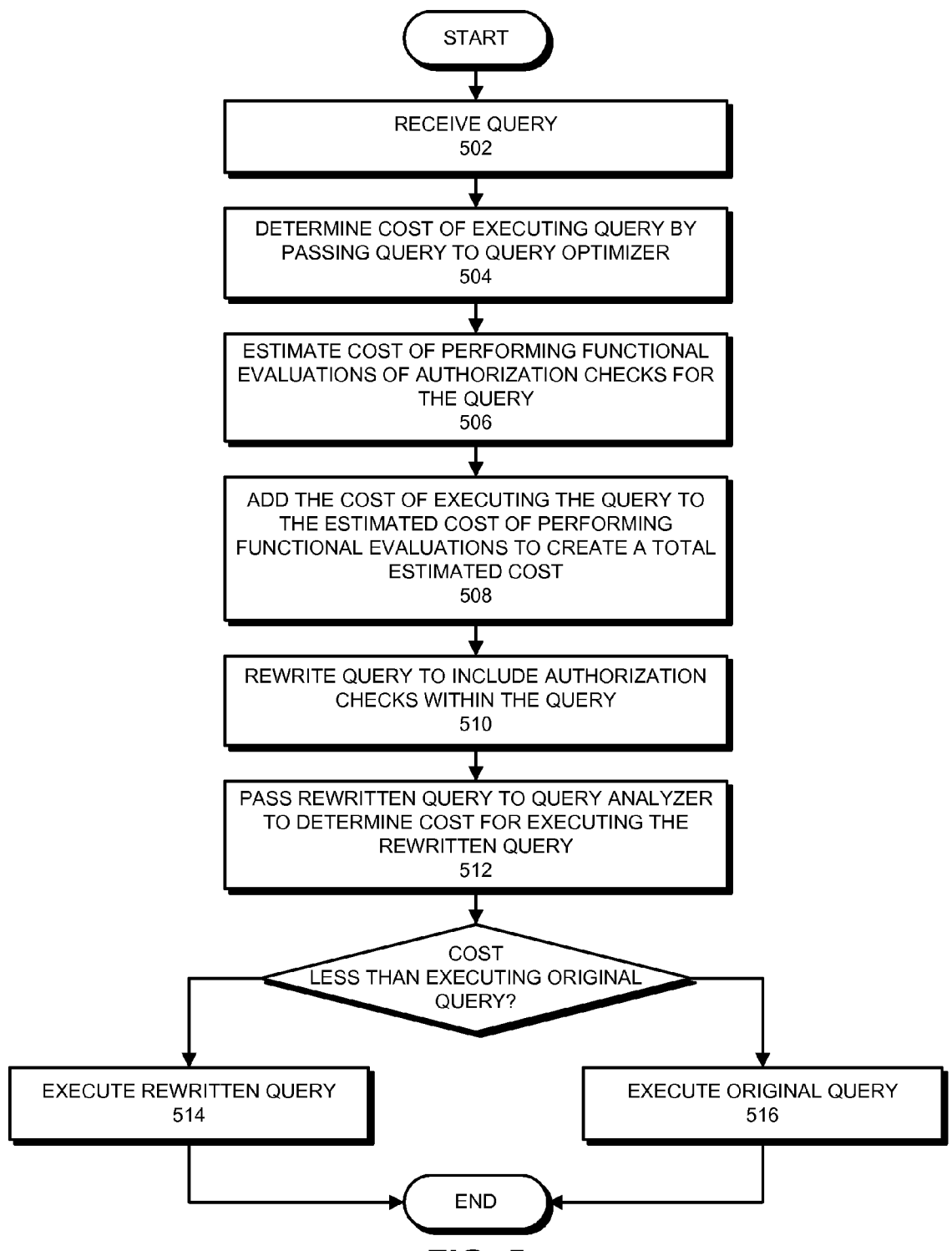
FIG. 5 presents a flowchart illustrating the process of cost-based optimization in accordance with an embodiment of the present invention.

FIG. 5 presents a flowchart illustrating the process of cost-based optimization in accordance with an embodiment of the present invention. During operation, the system receives a query (operation 502). Next, the system determines the cost of executing the query by passing the query to the query optimizer (operation 504). The system also estimates the cost of performing functional evaluations of the authorization checks for the query (operation 506). The system then adds the cost of executing the query to the estimated cost of performing the functional evaluations to create a total estimated cost of executing the query (operation 508).

The system also rewrites the query to include the authorization checks within the query (operation 5 10). The system passes the rewritten query to the query analyzer to determine a cost for executing the rewritten query (operation 512). If the estimated cost of executing the rewritten query is less than the total estimated cost of executing the query, the system executes the rewritten query (operation 514). Otherwise, the system executes the original query, including performing the function evaluations (operation 516).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a cost-based optimization of authorization checks in a database system, the method comprising:
   receiving an original query at the database system;
   estimating a total execution cost for the received original query, wherein the total execution cost includes a cost for executing the received original query and an estimated cost for evaluating an access control list;
   rewriting the received original query by adding:
      a new predicate with one or more rules from a dynamic access control list, if the access control list is dynamic; or
      a new predicate with a subquery referencing an index on a table that stores access control lists, if the access control list is static;
   estimating a cost for executing the rewritten received original query;
   in response to the estimated cost for executing the rewritten received original query being lower than the estimated total execution cost for the received original query, executing the rewritten received original query; and
   in response to the estimated cost for executing the rewritten received original query being higher than the estimated total execution cost for the received original query, executing the received original query.

2. The method of claim 1, wherein the estimating the total execution cost for the received original query involves:
   identifying a user associated with the original query;
   determining one or more database entities associated with the original query;
   determining one or more access control lists (ACLs) associated with the identified user and the determined one or more database entities; and
   performing access control list evaluations on the determined one or more ACLs.

3. The method of claim 2, wherein the performing the access control list evaluations on the determined one or more ACLs involves:
   determining a cache-miss ratio for the determined one or more ACLs; and
   adjusting the estimated cost to reflect the determined cache-miss ratio.

4. The method of claim 1, wherein the estimating the total execution cost for the received original query involves:
   passing the received original query to a query optimizer; and
   receiving the cost for executing the received original query from the query optimizer.

5. The method of claim 1, wherein the estimating the cost for executing the rewritten received original query involves:
   passing the rewritten received original query to a query optimizer; and
   receiving the cost for executing the rewritten received original query from the query optimizer.

6. The method of claim 1, wherein the estimating the cost for the evaluating the access control list involves:
   determining a number of rows returned by the received original query;
   determining an average cost for performing an authorization check; and
   multiplying the determined number of rows returned by the received original query with the determined average cost for performing the authorization check.

7. The method of claim 1, wherein upon executing the received original query or the rewritten received original query, the method further comprises saving statistics related to the cost for performing an access control list evaluation to facilitate subsequent estimations for the cost for the evaluating the access control list.

8. The method of claim 1, wherein evaluating the access control list includes determining whether to allow a requested action by checking privileges granted by the access control list against requested privileges.

9. A non-transitory computer-readable storage medium storing instructions that when executed by a computer cause the computer to perform a method for performing a cost-based optimization of authorization checks in a database system, the method comprising:
   receiving an original query at the database system;
   estimating a total execution cost for the received original query, wherein the total execution cost includes a cost for executing the received original query and an estimated cost for evaluating an access control list;
   rewriting the received original query by adding:
      a new predicate with one or more rules from a dynamic access control list, if the access control list is dynamic; or
      a new predicate with a subquery referencing an index on a table that stores access control lists, if the access control list is static;
   estimating a cost for executing the rewritten received original query;
   in response to the estimated cost for executing the rewritten received original query being lower than the estimated total execution cost for the received original query, executing the rewritten received original query; and
   in response to the estimated cost for executing the rewritten received original query being higher than the estimated total execution cost for the received original query, executing the received original query.

10. The non-transitory computer-readable storage medium of claim 9, wherein the estimating the total execution cost for the received original query involves:
   identifying a user associated with the original query;
   determining one or more database entities associated with the original query;
   determining one or more access control lists (ACLs) associated with the identified user and the determined one or more database entities; and
   performing access control list evaluations on the determined one or more ACLs.

11. The non-transitory computer-readable storage medium of claim 10, wherein the performing the access control list evaluations on the determined one or more ACLs involves:
  determining a cache-miss ratio for the determined one or more ACLs; and
  adjusting the estimated cost to reflect the determined cache-miss ratio.

12. The non-transitory computer-readable storage medium of claim 9, wherein the estimating the total execution cost for the received original query involves:
  passing the received original query to a query optimizer; and
  receiving the cost for executing the received original query from the query optimizer.

13. The non-transitory computer-readable storage medium of claim 9, wherein the estimating the cost for executing the rewritten received original query involves:
  passing the rewritten received original query to a query optimizer; and
  receiving the cost for executing the rewritten received original query from the query optimizer.

14. The non-transitory computer-readable storage medium of claim 9, wherein the estimating the cost for the evaluating the access control list involves:
  determining a number of rows returned by the received original query;
  determining an average cost for performing an authorization check; and
  multiplying the determined number of rows returned by the received original query with the determined average cost for performing the authorization check.

15. The non-transitory computer-readable storage medium of claim 9, wherein upon executing the received original query or the rewritten received original query, the method further comprises saving statistics related to the cost for performing an access control list evaluation to facilitate subsequent estimations for the cost for the evaluating the access control list.

16. The non-transitory computer-readable storage medium of claim 9, wherein evaluating the access control list includes determining whether to allow a requested action by checking privileges granted by the access control list against requested privileges.

17. An apparatus configured to perform a cost-based optimization of authorization checks in a database system, the method comprising:
  a processor;
  a memory;
  a receiving mechanism configured to receive an original query at the database system;
  a cost-estimation mechanism configured to estimate a total execution cost for the received original query, wherein the total execution cost includes a cost for executing the received original query and an estimated cost for evaluating an access control list;
  a query-rewriting mechanism configured to rewrite the received original query by adding:
    a new predicate with one or more rules from a dynamic access control list, if the access control list is dynamic; or
    a new predicate with a subquery referencing an index on a table that stores access control lists, if the access control list is static;
  wherein the cost-estimation mechanism is further configured to estimate a cost for executing the rewritten received original query; and
  an execution mechanism configured to:
    in response to the estimated cost for executing the rewritten received original query being lower than the estimated total execution cost for the received original query, execute the rewritten received original query; and
    in response to the estimated cost for executing the rewritten received original query being higher than the estimated total execution cost for the received original query, execute the received original query.

18. The apparatus of claim 17, wherein the cost-estimation mechanism is further configured to:
  identify a user associated with the original query;
  determine one or more database entities associated with the original query;
  determine one or more access control lists (ACLs) associated with the identified user and the determined one or more database entities; and
  perform access control list evaluations on the determined one or more ACLs.

19. The apparatus of claim 18, wherein the cost-estimation mechanism is further configured to perform the access control list evaluations on the determined one or more ACLs by:
  determining a cache-miss ratio for the determined one or more ACLs; and
  adjusting the estimated cost to reflect the determined cache-miss ratio.

20. The apparatus of claim 17, wherein the cost-estimation mechanism is further configured to estimate the total execution cost for the received original query by:
  passing the received original query to a query optimizer; and
  receiving the cost for executing the received original query from the query optimizer.

21. The apparatus of claim 17, wherein the cost-estimation mechanism is further configured to estimate the cost for executing the rewritten received original query by:
  passing the rewritten received original query to a query optimizer; and
  receiving the cost for executing the rewritten received original query from the query optimizer.

22. The apparatus of claim 17, wherein the cost-estimation mechanism is further configured to estimate the cost for the evaluating the access control list by:
  determining a number of rows returned by the received original query;
  determining an average cost for performing an authorization check; and
  multiplying the determined number of rows returned by the received original query with the determined average cost for performing the authorization check.

23. The apparatus of claim 17, wherein the execution mechanism is further configured to save statistics related to the cost for performing an access control list evaluation to facilitate subsequent estimations for the cost for the evaluating the access control list.

24. The apparatus of claim 17, wherein evaluating the access control list includes determining whether to allow a requested action by checking privileges granted by the access control list against requested privileges.

* * * * *

UNITED STATES PATENT AND TRADEMARK OFFICE
CERTIFICATE OF CORRECTION

PATENT NO. : 8,392,405 B2
APPLICATION NO. : 12/144028
DATED : March 5, 2013
INVENTOR(S) : Idicula et al.

It is certified that error appears in the above-identified patent and that said Letters Patent is hereby corrected as shown below:

In the Claims

In column 7, line 7, delete "5 10)." and insert -- 510). --, therefor.

Signed and Sealed this
Thirtieth Day of July, 2013

Teresa Stanek Rea
*Acting Director of the United States Patent and Trademark Office*